US012442527B2

(12) United States Patent
Etorre et al.

(10) Patent No.: US 12,442,527 B2
(45) Date of Patent: Oct. 14, 2025

(54) RECEPTACLE ASSEMBLY WITH GASKET

(71) Applicant: Schreder S.A., Brussels (BE)

(72) Inventors: Laurent Etorre, Liege (BE); Marcel Thijs, Liege (BE)

(73) Assignee: Schreder S.A., Brussels (BE)

(*) Notice: Subject to any disclaimer, the term of this patent is extended or adjusted under 35 U.S.C. 154(b) by 202 days.

(21) Appl. No.: 18/040,301

(22) PCT Filed: Aug. 3, 2021

(86) PCT No.: PCT/EP2021/071616
§ 371 (c)(1),
(2) Date: Feb. 2, 2023

(87) PCT Pub. No.: WO2022/029099
PCT Pub. Date: Feb. 10, 2022

(65) Prior Publication Data

US 2023/0358394 A1 Nov. 9, 2023

(30) Foreign Application Priority Data

Aug. 3, 2020 (NL) ..................................... 2026201

(51) Int. Cl.
*F21V 23/06* (2006.01)
*F21V 23/04* (2006.01)
(Continued)

(52) U.S. Cl.
CPC ........ *F21V 31/005* (2013.01); *F21V 23/0464* (2013.01); *F21V 23/06* (2013.01); *F16J 15/064* (2013.01); *F21W 2131/10* (2013.01)

(58) Field of Classification Search
CPC ............................... F21V 23/06; F21V 31/005
See application file for complete search history.

(56) References Cited

U.S. PATENT DOCUMENTS

2010/0190375 A1* 7/2010 Rohde ................ H01R 13/5202 439/549
2019/0044294 A1 2/2019 Siacotos et al.
2022/0299199 A1* 9/2022 Mugan ................ F21V 23/0464

FOREIGN PATENT DOCUMENTS

CN 201008071 Y 1/2008
WO 2020099393 A1 5/2020
WO 2020212515 A1 10/2020

OTHER PUBLICATIONS

PCT International Search Report and Written Opinion, Application No. PCT/EP2021/071616, mailed Oct. 19, 2021, 11 pages.

* cited by examiner

*Primary Examiner* — Sean P Gramling
(74) *Attorney, Agent, or Firm* — McDonnell Boehnen Hulbert & Berghoff LLP

(57) ABSTRACT

Example embodiments relate to receptacle assemblies with gaskets. One example includes a receptacle assembly for a luminaire system. The receptacle assembly includes a receptacle and a gasket. The receptacle has a front side and a rear side. The front side is configured for receiving electrical contacts of an external module. The rear side is configured for extending in an opening of a housing, preferably a luminaire housing, and for being electrically connected to components in the housing. The gasket is configured for being located between the receptacle and the housing on which the receptacle is to be mounted. The receptacle assembly is provided with an indicator means at a location which is visible when the receptacle is mounted on the housing.

20 Claims, 7 Drawing Sheets

(51) Int. Cl.

| | |
|---|---|
| ***F21V 31/00*** | (2006.01) |
| *F16J 15/06* | (2006.01) |
| *F21W 131/10* | (2006.01) |

RECEPTACLE ASSEMBLY WITH GASKET

CROSS-REFERENCE TO RELATED APPLICATIONS

The present application is a national stage entry of PCT/EP2021/071616 filed Aug. 3, 2021, which claims priority to NL 2026201 filed Aug. 3, 2020, the contents of each of which are hereby incorporated by reference.

FIELD OF INVENTION

The field of the invention relates to receptacle assemblies, in particular for luminaire systems, and in particular receptacle assemblies mountable on a luminaire housing, more in particular on an outdoor or industrial luminaire housing.

BACKGROUND

Luminaire systems for roadways, parking lots and other outdoor or industrial areas typically use plug twist-lock external modules containing different control blocks and/or sensors, e.g. a light sensor for sensing the light level of ambient light to automatically control the light sources of the lighting equipment. For uniformity throughout the lighting industry, electrical receptacles for receiving such external modules are mostly made according to specific standards such as standards approved by American National Standards Institute, Inc. (ANSI). Such receptacles are typically mounted in an opening of the luminaire housing and are electrically connected to various components of the luminaire system. The receptacle has a connection interface located on an external side of the housing, so that an external module can be plugged into the receptacle e.g. to provide control for the luminaire system.

An external module typically comprises at least three standard prongs or plug contacts which are inserted into corresponding apertures in the receptacle. After the prongs are completely inserted, the external module is rotated to lock it in place. This can be done without tooling, allowing luminaires to be simply and quickly upgraded. The external module may comprise further contacts in the form of conductive springs for cooperating with receptacle contacts in the form of conductive plates. Preferably, the receptacle and the external module fulfil the requirements of the ANSI C136.10-2017 standard or of the ANSI C136.41-2013 standard or of the Zhaga Interface Specification Standard (Book 18, Edition 1.0, July 2018, see https://www.zhagastandard.org/data/downloadables/1/0/8/1/book_18.pdf).

When installing an external module by inserting the prongs and twisting the external module, the required exerted force may be quite high and it may be difficult to know when the external module is correctly locked. This will hinder the good operation of the external module. Especially for NEMA socket assemblies, it is often difficult for an operator to "feel" when the external module is twisted in the right position.

SUMMARY

The object of embodiments of the invention is to provide a receptacle assembly, or socket assembly, for a system, preferably a luminaire system, which can be more easily installed.

According to an aspect of the invention there is provided a receptacle assembly for a system, in preferably a luminaire system. The receptacle assembly comprises a receptacle and a gasket. The receptacle has a front side and a rear side. The front side is configured for receiving electrical contacts of an external module. The rear side is configured for extending in an opening of a housing, preferably a housing of the luminaire system, and for being electrically connected to components in the housing. The gasket is configured for being located at least partially between the receptacle and the housing on which the receptacle is to be mounted. The receptacle assembly is provided with an indicator means at a location which is visible when the receptacle is mounted on the housing.

By adding an indicator means to the receptacle assembly, an indication is provided to the operator who has to install an external module. Indeed, the indicator means can serve as a reference which can be matched to a position of the external module. For example, the external module can be provided with an indication that has to be aligned with the indicator means in order for the external module to be correctly positioned. In that way an operator can check whether the external module is correctly positioned in a convenient manner, even in cases where it is difficult to feel whether the external module has been sufficiently twisted.

In an exemplary embodiment, the receptacle is configured to receive and cooperate with the external module, and the indicator means is provided to the receptacle assembly at a location which is visible when the external module is mounted on the receptacle.

In an exemplary embodiment, the indicator means is provided to the gasket at a location which is visible when the receptacle is mounted on the housing.

In this way, the indicator means can be easily provided to the gasket without the need for complex modifications to other parts of the receptacle assembly. The indicator means can be provided in a simple manner such that it is visible during installation of the external module. Whilst a sealing portion of the gasket will be present typically at least in an area between the receptacle and the housing, the indicator means will extend out of this area in order to be visible. Also, by providing the indicator means to the gasket it can be achieved that the indicator means remains visible to the operator, also when the external module is located on the receptacle. For completeness, it is noted that the front side of the receptacle itself may also contain indications but such indications may no longer be visible once the external module is arranged above the front side. In contrast, the indicator means of the gasket will remain visible, also when an external module is present.

Preferably, the indicator means is configured to indicate a correct positioning of the external module in the receptacle. More preferably, the receptacle is configured to receive the external module by inserting and twisting, and the indicator means is configured to indicate when the external module is in the correct twisted position. More in particular the receptacle and the external module may be configured to be coupled through a twist-lock mechanism as described in ANSI C136.10-2017 standard or ANSI C136.41-2013 standard or Zhaga Interface Specification Standard (Book 18, Edition 1.0, July 2018, see https://www.zhagastandard.org/data/downloadables/1/0/8/1/book_18.pdf), which are included herein by reference.

Preferably, the indicator means is an integral part of the gasket. For example, the gasket may be made of a polymer material, e.g. a rubber material, and the indicator means may be formed by an indicator portion which is molded together with a sealing portion of the gasket. Preferably, the indicator means is made of the same material as the gasket in a common mould. However, the indicator means could also be provided in a different manner, e.g. by overmoulding, and the indicator means could be made of a different material.

In an exemplary embodiment, the indicator means comprises a lip protruding outwardly from a periphery of the gasket, preferably over a length which is more than 10 mm, more preferably more than 15 mm. For NEMA assemblies a length of the lip of about 15 mm to 25 mm will typically be sufficient. For Zhaga assemblies, the external module typically has a much larger diameter than the receptacle and the length of the lip may be higher.

In an exemplary embodiment, the receptacle has a housing comprising a substantially cylindrical front portion at the front side of the receptacle, and a rear portion protruding rearwardly at a rear side of the substantially cylindrical front portion and intended to extend through an opening in the housing, wherein the gasket is configured to be arranged around said rear portion. In that manner the rear portion may be inserted through an opening of the housing, e.g. of a luminaire housing, whilst the front portion abuts against a wall portion surrounding the opening. It is noted that although exemplary embodiments of the invention relate to the housing of a luminaire system, other embodiments may relate to a gasket assembly according to the invention for use in combination with the housing of systems other than luminaire systems, i.e., systems not having an illumination function, e.g., systems comprising a communication means (antennas, loudspeakers, or the like) and/or systems comprising a sensing means (image capturing means such as cameras, presence and/or motion sensors, ambient light sensors, microphones, smoke sensors, air quality sensors, or the like). It should be also noted that the exemplary embodiments disclosed in the present application can be equally applied to any such system other than a luminaire system.

In an exemplary embodiment, the receptacle, and in particular the rear portion of the receptacle, is provided with a flat portion on the peripheral wall between the front side and the rear side to ensure a proper alignment of the receptacle with respect to the opening in the housing. In such an embodiment, preferably the opening in the housing is also provided with a corresponding flat portion. The gasket is provided with an opening through which the rear side of the receptacle extends, wherein an inner peripheral wall of the gasket delimiting said opening is provided with a flat wall section corresponding to the flat portion of the peripheral wall between the front side and the rear side of the receptacle. This facilitates a correct alignment of the receptacle with respect to the luminaire housing, and for some applications this also results in a desired orientation with respect to the road.

In an exemplary embodiment, the receptacle is provided at the rear side thereof with a screw-thread, and the receptacle assembly further comprises a nut configured to be screwed on the screw-thread of the receptacle. In that manner the receptacle can be easily fixed in an opening of a housing of a luminaire. Alternatively or additionally, the receptacle can be fixed to the housing by screws.

According to an exemplary embodiment, the receptacle comprises an RFID tag, preferably at the front side or at a lateral side of the receptacle. Including an RFID tag in a receptacle has been described in detail in PCT publication WO 2017/133793 in the name of the applicant, which is included herein by reference. WO 2017/133793 relates to an RFID tag for transmitting luminaire-specific data. However, it is noted that the RFID tag may also be used for other purposes than those described in WO 2017/133793, such as, for example, for communication with/configuration of the external device and/or any luminaire component.

As mentioned above, the external module may be provided with an indication that has to be aligned with the indicator means in order for the external module to be correctly positioned, preferably at a lateral side of the external module. The indication on the external module may be a simple mark, or may in some cases further comprise e.g. an RFID tag or any other communication means (e.g. Bluetooth) or may further comprise a smart label such as a QR code.

According to an exemplary embodiment, the receptacle and the external module comprise an RFID tag. In this way, the indicator means may be used to ensure proper alignment of the two RFID tags.

In an exemplary embodiment, the receptacle is provided with at least two fixation through-holes for receiving at least two fixation means for fixing the receptacle to the housing, and the gasket is provided with at least two corresponding through-holes through which said at least two fixation means can extend. Optionally also a nut as described above may be present.

Preferably, the at least two fixation through-holes comprise a first and a second fixation through-hole located at diametrically opposite sides of the receptacle, and the at least two corresponding through-holes in the gasket comprise a first and a second through-hole located at diametrically opposite sides of the gasket. A radial line through the first and second through-hole of the gasket and a radial line through the indicator means may be at an angle between 85° and 105°, preferably between 90° and 100°, for example of 96.05°. This configuration may be particularly useful for the above-mentioned embodiment wherein the receptacle and the external module comprise an RFID tag, in order to ensure their respective proper alignment. Said angle may be defined by the RFID tag positions in the receptacle and in the external module. As the two RFID tags need to be as close as possible to each other in order to read all data from the luminaire and/or the external module, an angle as defined above that is between 85° and 105°, preferably between 90° and 100°, for example of 96.05°, may constrain the location of the indicator means.

In an exemplary embodiment, the receptacle is configured for being substantially surrounded by the external module when the external module is mounted on the receptacle.

In an exemplary embodiment, a diameter of the receptacle is smaller than a diameter of the external module, and a diameter of the gasket, in particular an outer diameter of the gasket, is larger than the diameter of the external module at least at the location of the indicator means.

In an exemplary embodiment, the gasket is provided with an outwardly protruding portion configured for protruding outside the receptacle at the location of the indicator means.

Regarding the above exemplary embodiments, it may be advantageous to provide the gasket with the indicator means. As already stated above, by providing the indicator means to the gasket it can be achieved that the indicator means remains visible to the operator, also when the external module substantially surrounds the receptacle when mounted on the receptacle. It is noted that the external module may surround the entire lateral side of the receptacle when mounted on the receptacle. Hence, it is noted that the front side and the lateral side of the receptacle itself may also contain indications, but such indications may no longer be visible once the external module is arranged above the front side and surrounds the lateral side. In contrast, the indicator means of the gasket will remain visible, also when an external module is present.

In an exemplary embodiment, the gasket has a ring shaped portion and a lip portion connected to an outer periphery of the ring shaped portion. It is noted that the ring-shaped portion does not need to be circular and may have a non-circular outer periphery and/or a non-circular inner periphery. As the receptacle typically has a substantially circular front side, preferably the outer periphery is substantially circular. However, as set out above, the inner periphery may have a flat wall portion. In a preferred embodiment, the ring-shaped portion has a substantially circular outer periphery with an outer diameter between 40 mm and 100 mm, preferably between 55 mm and 80 mm. Preferably, a radial length of the lip portion is larger than 10 mm, more preferably larger than 15 mm, e.g. between 10 mm and 50 mm.

In another exemplary embodiment the indictor means is created by giving the gasket a polygonal outer periphery, such that one or more of the corners of the gasket may form an indicator means.

In yet another exemplary embodiment, the gasket is provided with two or more lips instead of one lip. This may further facilitate the visibility of the indicator means from different sides of the receptacle assembly. This skilled person understands that many variants are possible and that the gasket may be given many suitable shapes that will result in an indicator means being present. Accordingly, the external module may be provided with two or more indications in order for the external module to be correctly positioned, preferably at a lateral side of the external module.

In an exemplary embodiment, the gasket has a top surface intended to be in contact with the receptacle and a bottom surface intended to be in contact with the housing. Preferably, the top surface is provided with a least one alignment feature configured to align the gasket with respect to the receptacle. In that way the gasket can be easily aligned with respect to the receptacle before fixing the assembly on the housing. Preferably, the at least one alignment feature comprises at least two protrusions. Preferably, the top surface is provided with a peripheral rib configured to be in sealing engagement with the receptacle, wherein the at least two protrusions may be arranged on the peripheral rib. The bottom surface may be provided with at least one peripheral rib configured to be in sealing engagement with the housing.

In an exemplary embodiment, the receptacle houses a plurality of receptacle contacts. Preferably, each receptacle contact is provided, at a front end, with a front contact portion configured for being electrically connected with a contact of the external module, and, at a rear end, with at least one wire receiving contact portion in which at least one wire is fixed. The receptacle can be fixed to a housing of the system, such that the electrical contacts of an external module can be plugged in the front side to be in electrical contact with the front contact portions, and such that the wires are available inside the housing for being connected to different luminaire components. In a possible embodiment, at least one receptacle contact of said plurality of receptacle contacts is provided, at said rear end, with at least two wires, such that the number of wires provided at the rear side is higher than the number of front contact portions. Exemplary embodiments thereof are disclosed in patent application PCT/EP2020/060751 in the name of the applicant which is included herein by reference.

The external module may comprise any one or more of the following: a sensor (e.g. a light sensor, a motion sensor, a passive infrared sensor, an environmental sensor, a visibility sensor, an image sensor, a radar sensor, a sound sensor, a voice recorder, a pollutant sensor, a microphone, a detector of $CO_2$, $NO_x$, smoke, etc.), communication circuitry, control circuitry, protection circuitry (e.g. an SPD or a fuse), a metering circuitry, an actuator, an energy storage element, etc. More generally the external module may comprise any component that needs to be powered, any component involved in the transmission and/or reception of signals, any component completing the circuitry inside the luminaire head, such as protection circuitry, etc.

It is further noted that the external module may be configured to receive a further external module. In other words, a stack of interconnected external modules may be arranged in the receptacle, wherein some functionalities may be included in a first external module and other functionalities in a second external module. In that manner, the system is given an extra degree of modularity.

Also, it is noted that it is possible to provide one or more functionalities in the receptacle itself, such as a sensor, communication circuitry, control circuitry, protection circuitry (e.g. an SPD or a fuse), an actuator, etc.

According to an exemplary embodiment, the plurality of receptacle contacts comprises a plurality of first receptacle contacts and optionally one or more second receptacle contacts.

In an exemplary embodiment, seen in a radial direction around a central axis of the receptacle, the plurality of first receptacle contacts are positioned further away from the central axis than the one or more second receptacle contacts.

In a first variant, the one or more second receptacle contacts may be used for carrying one or more power signals for feeding components of the external module, and the plurality of first receptacle contacts may be used for carrying data or control signals, typically low-current, low-voltage signals. Optionally, one of the plurality of first receptacle contacts and/or one of the one or more second receptacle contacts may be used for carrying both a power signal and a data or control signal.

In another variant, no second receptacle contacts are provided, and the plurality of first receptacle contacts comprises both one or more contacts for carrying a power signal as well as one or more contacts for carrying a data or control signal, wherein optionally one or more contacts may be used for carrying both power and data/control signals. In such an embodiment, typically, at least three first receptacle contacts are provided of which two carry power signals and one a data or control signal. In yet another variant without second receptacle contacts, the plurality of first receptacle contacts comprises only receptacle contacts for carrying power supply signals, e.g. two DC terminal contacts, of which one may be a ground terminal.

In a further variant, the one or more second receptacle contacts may be used for carrying one or more data or control signals, and the plurality of first receptacle contacts may be used for carrying power signals. The one or more second receptacle contacts may then be e.g. a central pin terminal surrounded by a cylindrical contact terminal (e.g. an RCA connector).

In yet another variant first and second receptacle contacts are present and the first and/or second receptacle contacts carry both power and data/control signals.

The skilled person understands that other combinations are possible, and that one or more receptacle contacts may be used for carrying both a power signal and a control/data signal and/or that control messages may be included in a power signal.

Preferably, the plurality of first receptacle contacts extends substantially along a first cylindrical surface around the central axis. When more than one second receptacle contact is present, the two or more second receptacle contacts may extend substantially along a second cylindrical surface around the central axis. However, it is also possible to have two second receptacle contacts in the form of a central pin and a surrounding cylindrical contact (e.g. an RCA connector) arranged centrally at the front side of the receptacle. Also, if only one second receptacle contact is provided, it may be arranged centrally. Alternatively, it may be arranged externally of the first cylindrical surface, further away of the central axis of the receptacle. If no second receptacles are present, typically at least three first receptacle contacts are present, more preferably four receptacle contacts.

In an exemplary embodiment, the front contact portions of the plurality of first receptacle contacts extend flush with the front side of the receptacle. For example, the front contact portions of the plurality of receptacle contacts fulfil the requirements of the ANSI C136.41-2013 standard or the ANSI C136.10-2017 standard.

In another exemplary embodiment, the front contact portions of the plurality of first receptacle contacts are accessible via apertures in the front side of the receptacle and extend near the front side of the receptacle. For example, the front contact portions of the plurality of receptacle contacts fulfil the requirements of the Zhaga standard mentioned above.

Optionally an alignment recess or protrusion may be provided at the front side of the receptacle, said alignment recess or protrusion being configured for cooperating with an alignment protrusion or recess of the external module. The alignment recess may be a central hole for receiving a central pin of the external module. In another variant, there may be provided an alignment mark on both the receptacle and the external module to allow an operator to align the external module with the receptacle.

According to an exemplary embodiment, the plurality of receptacle contacts comprises at least one receptacle contact for carrying a power signal and/or at least one receptacle contact for carrying a data or control signal and/or at least one receptacle contact for carrying both a power signal and a data or control signal. In an exemplary embodiment, the plurality of receptacle contacts comprises at least three receptacle contacts for carrying power signals and/or at least two receptacle contacts for carrying data or control signals. In another exemplary embodiment, the plurality of receptacle contacts comprises one receptacle contact for carrying a power signal, one receptacle contact for carrying both a power and a data/control signal, and/or at least two receptacle contacts for carrying data or control signals.

It is noted that the at least two power signals may comprise DC and/or AC signals. For example, a DC power supply signal may be transferred through the receptacle, wherein there is provided a first DC terminal contact for a positive DC voltage and a second DC terminal contact for a ground connection (wherein optionally the ground connection may also be used as a ground terminal for a data or control signal). Such an embodiment may be conform the Zhaga standard mentioned above. Alternatively or in addition, an AC power supply signal may be transferred through the receptacle, wherein there is provided a first, second and third AC terminal contact for a three-phase AC signal. Such an embodiment may be conform the NEMA standards mentioned above.

Optionally, the receptacle may be configured and/or mounted as described in patent application NL2023425 in the name of the applicant, which is included herein by reference.

According to a further aspect, the invention relates to a use of a receptacle assembly according to any one of the previous embodiments for mounting an external module, said external module having an indication, wherein said indication is aligned with the indicators means of the receptacle assembly, preferably of the gasket of the receptacle assembly.

According to a further aspect, the invention relates to a gasket for use in a receptacle assembly of a luminaire system, said gasket being configured for being located between a receptacle and a housing, preferably a luminaire housing, on which the receptacle is to be mounted; wherein said gasket is provided with an indicator means at a location which is visible when the receptacle is mounted on the housing. The gasket may have any of the features described above for the first aspect.

According to another aspect there is provided a luminaire comprising electrical components, such as driver components and/or control components, a luminaire housing in which the electrical components are arranged, and a receptacle assembly according to any one of the previous embodiments. The luminaire housing has an opening, and the receptacle is arranged partially in the opening of the luminaire housing with its rear side facing an inner space of the luminaire housing and its front side accessible outside the luminaire housing, wherein the gasket is arranged at least partially between the receptacle and an outer surface of the housing, around the opening, with the indicator means visible. Wires connect the receptacle to the electrical components. Preferably, a light source such as a LED array is arranged in the luminaire housing.

In embodiments of the invention the luminaire may comprise one or more of the following components, inside or outside of the luminaire housing:

- an energy storage element,
- protection circuitry, such as an electrostatic discharge device ESD or a surge protection device,
- a sensor, such as a sensor sensing environmental data. Examples of a sensor which may be included are a movement sensor, a light sensor, an image sensor, a radar sensor, a sound sensor, a voice recorder, a pollutant sensor, a microphone, a detector of CO2, NOx, smoke, etc.
- a metering device,
- power management circuitry preferably configured to manage the provision of power to the light sources of one or more luminaires; examples of power management circuitry comprise e.g. one or more of: a power meter, a fuse, a line protection, a circuit breaker, an electrical connection for multiple power lines, a clock, an astroclock, a power supply module, an PLC, a computer, a communication module, display circuitry, etc.;
- telecommunication and/or networking circuitry for wired and/or wireless communication, which can comprise at least one of: an optical fiber connection, a fiber to copper interface, a fiber patch panel, a modem, a router, a switch, a patch panel, a network video recorder (NVR), a computer;
- audio system management circuitry which can comprise at least one of: an amplifier, a transformer, a media player (connected to network or not), electrical connections for multiple loudspeaker lines, a computer;
- WiFi circuitry, wherein an antenna for receiving WiFi signals may be integrated either in the functional module or in a separate antenna module as in the exemplary embodiment described above;

charger circuitry, e.g. phone/computer/tablet charger circuitry or vehicle charger circuitry or UAV charger circuitry (such as drone charger circuitry);

a human interface device (HID) and the associated circuitry, e.g. a camera, a loudspeaker, a button, a display, etc.

a signaling device, e.g. a light ring capable of performing signaling;

a mechanical and/or electrical plug-in device, e.g. a universal plug-in module, e.g. a mechanical device to fix a flag, a waste bin, etc.

More in particular any components described in any one of the following patent applications of the applicant may be included in the luminaire: a driver, optionally with one or more pluggable modules as described in PCT publication WO 2017/220690, an optical receiving means with control means as described in WO 2020/053342, a communication device as disclosed in NL application NL2023556 and PCT/EP2020/053326, a surge protection device as disclosed in PCT applications PCT/EP2020/050419, PCT/EP2020/050420, WO2020/064487 A1, and more generally any one of the components described in those documents which are included herein by reference.

According to yet another aspect, the invention relates to a use of a receptacle assembly according to any one of the previous embodiments, for transferring at least two power signals and optionally at least one data and/or control signal via a plurality of receptacle contacts between one or more components of an external module and one or more components arranged in a housing of a luminaire system. It is noted that at least two receptacle contacts of the plurality of receptacle contacts may be used for carrying power signals and that one or more receptacle contacts may be used for carrying data or control signals, wherein optionally one or more receptacle contacts are used for carrying both a power signal and a data or control signal.

It is noted that the at least two power signals may comprise DC and/or AC signals. For example, a DC power supply signal may be transferred through the receptacle, wherein there is provided a first DC terminal contact for a positive DC voltage and a second DC terminal contact for a ground connection (wherein optionally the ground connection may also be used as a ground terminal for a data or control signal). Such an embodiment may conform to the Zhaga standard mentioned above. Alternatively or in addition, an AC power supply signal may be transferred through the receptacle, wherein there is provided a first, second and third AC terminal contact for a three-phase AC signal. Such an embodiment may conform to the NEMA standards mentioned above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figures 1, 1A:
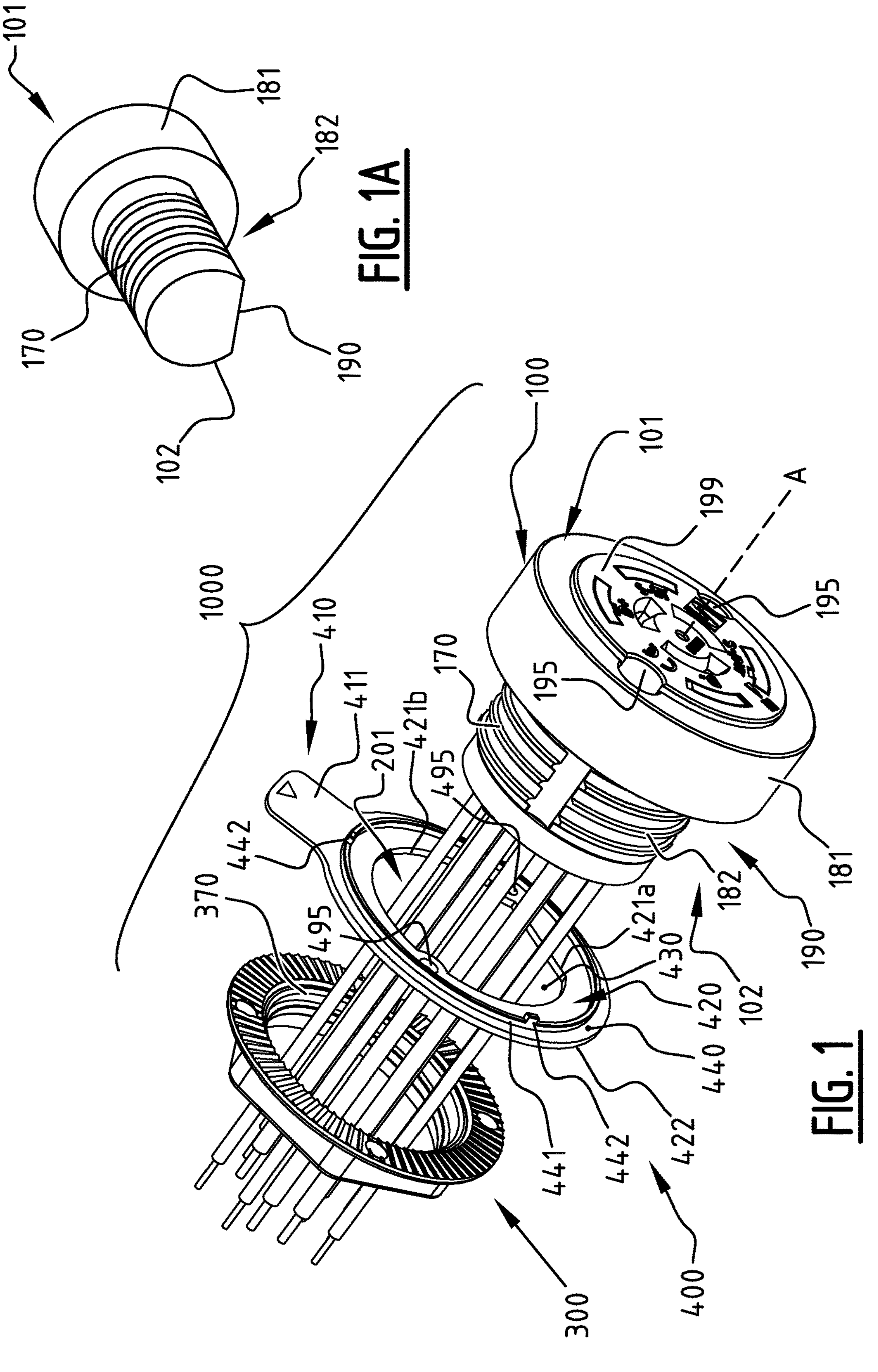
FIG. 1 is a schematic exploded view of an exemplary embodiment of a receptacle assembly.
FIG. 1A is a schematic perspective view of the receptacle of FIG. 1 seen from the other side.
Figure 2A:
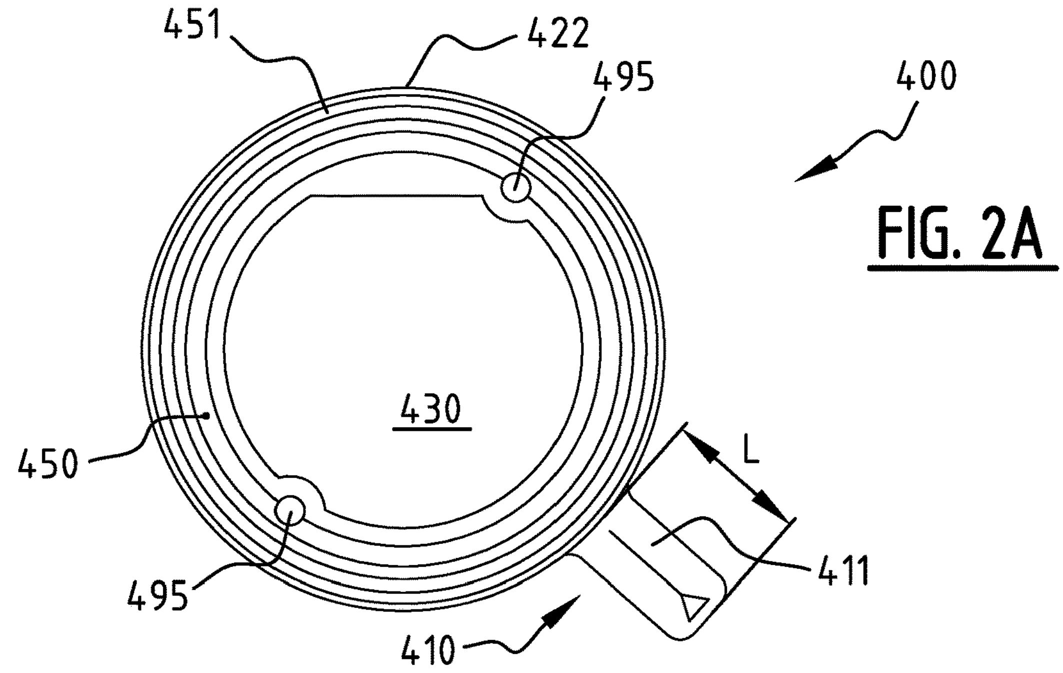
FIG. 2A is a bottom view of the gasket of FIG. 1.
Figure 2B:
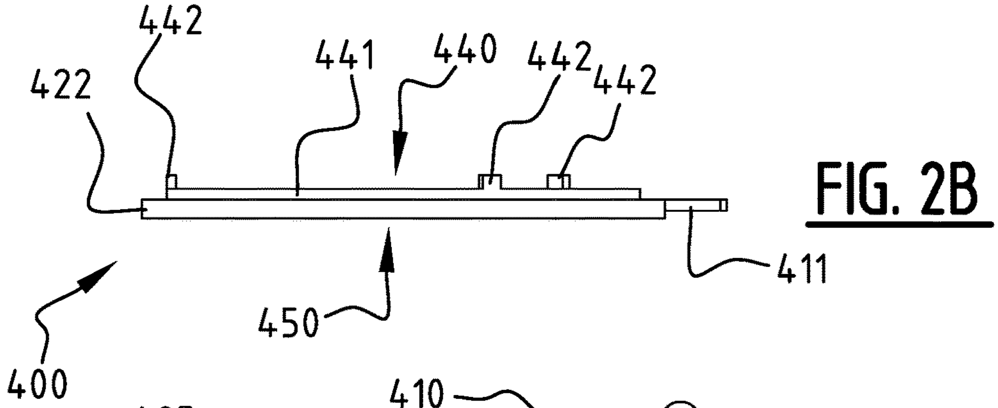
FIG. 2B is a side view of the gasket of FIG. 1.
Figure 2C:
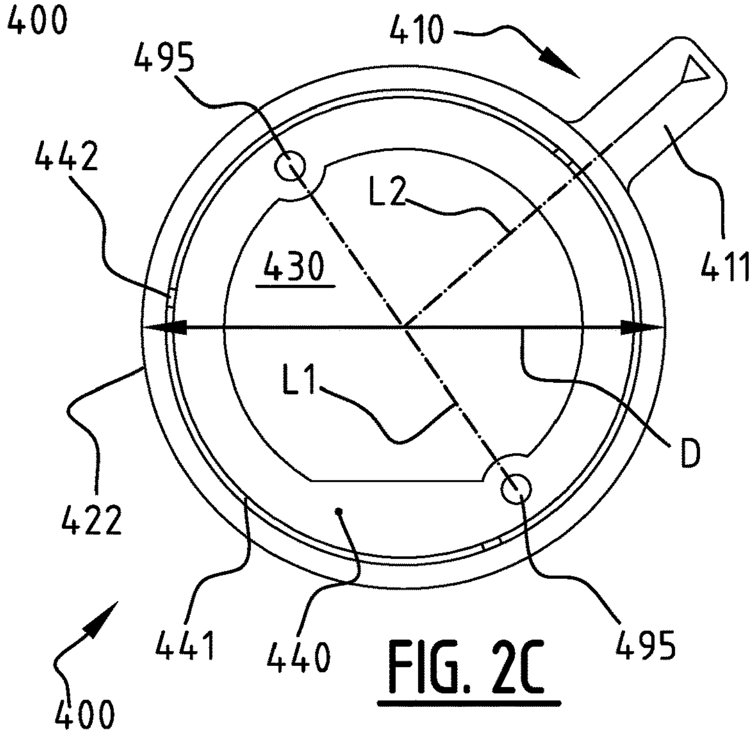
FIG. 2C is a top view of the gasket of FIG. 1.
Figure 2D:
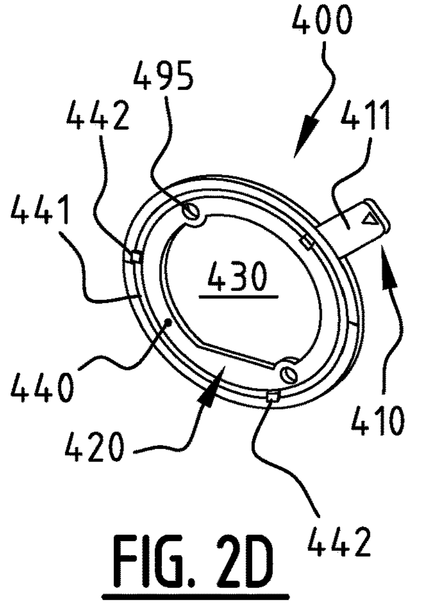
FIG. 2D is a perspective view of the gasket of FIG. 1.

FIG. 1 illustrates an exemplary embodiment of a receptacle assembly for e.g. a luminaire system, typically for an outdoor or industrial luminaire. The receptacle assembly 1000 comprises a receptacle 100, a nut 300 for fixing the receptacle 100 in an opening of a luminaire housing H (not shown in FIG. 1), and a gasket 400 to be inserted between the receptacle 100 and the luminaire housing H.

By outdoor or industrial luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area or large indoor area, such as roads and residential areas in the public domain, private parking areas and access roads to private building infrastructures, warehouse, industry halls, etc.

Figure 5:
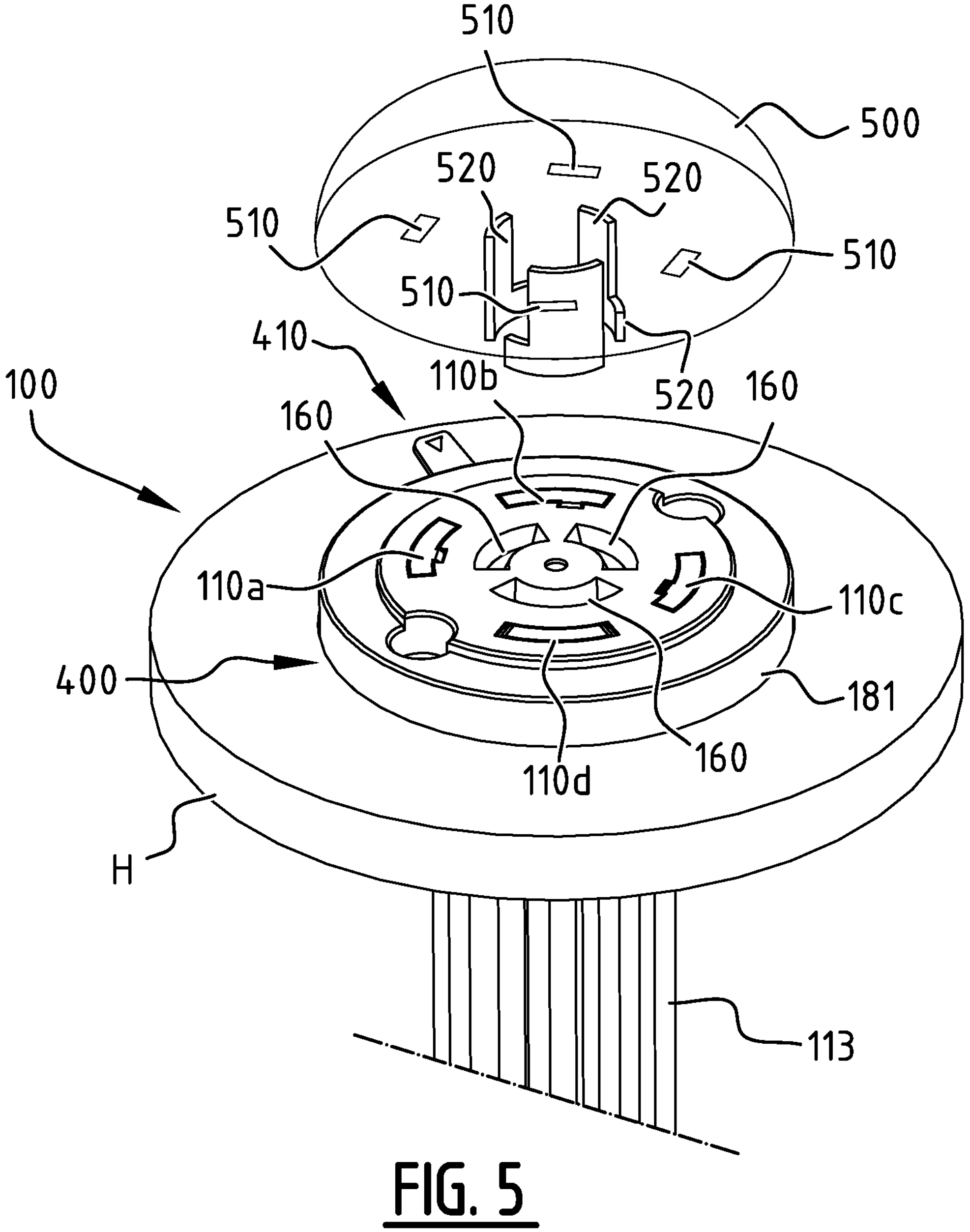
FIG. 5 is a schematic perspective view of an embodiment of a receptacle assembly mounted in a luminaire housing H and of a external module to be plugged in the receptacle of the receptacle assembly.

Luminaire systems for roadways, parking lots and other outdoor or industrial areas typically use plug twist-lock external modules 500 (see FIG. 5) containing different control blocks and/or sensors (not shown). An external module 500 may comprise e.g. a light sensor for sensing the light level of ambient light to automatically switch light fixtures on at dusk and off at dawn. More generally the external module 500 may comprise any one of the following: a sensor (e.g. a light sensor, a motion sensor, a passive infrared sensor, an environmental sensor, a visibility sensor, an image sensor, a radar sensor, a sound sensor, a voice recorder, a pollutant sensor, a microphone, a detector of CO2, NOx, smoke etc.), communication circuitry, control circuitry, protection circuitry (e.g. an SPD or a fuse), metering circuitry, an actuator, an energy storage element, etc. For uniformity throughout the lighting industry, electrical receptacles 100 for receiving such external modules 500 are mostly made according to specific standards such as standards approved by American National Standards Institute, Inc. (ANSI). Such receptacles 100 are typically mounted on a luminaire housing H (see FIG. 5), e.g. on a top or bottom surface of the luminaire housing, and are electrically connected to various components (not shown) of the lighting equipment through wires. An external module 500 is plugged into a receptacle 100 to provide e.g. control of the luminaire system.

The external module 500 typically comprises three standard prongs 520 (see FIG. 5, also called plug contacts or simply contacts) which are inserted into corresponding apertures 160 in the receptacle 100. After the prongs 520 are completely inserted, the external module 500 is rotated to lock it in place. When locked in place, the prongs 520 contact the receptacle contacts 120*a-c*, see also FIG. 3 which will be discussed in detail below. The external module 500 may comprise further contacts 510 in the form of conductive springs for cooperating with receptacle contacts 110*a-d* of receptacle 100 in the form of conductive plates, see also FIG. 3 which will be discussed in detail below. Preferably, the receptacle 100 and the external module 500 fulfil the requirements of the ANSI C136.10-2017 standard or the ANSI C136.41-2013 standard.

Figure 3:
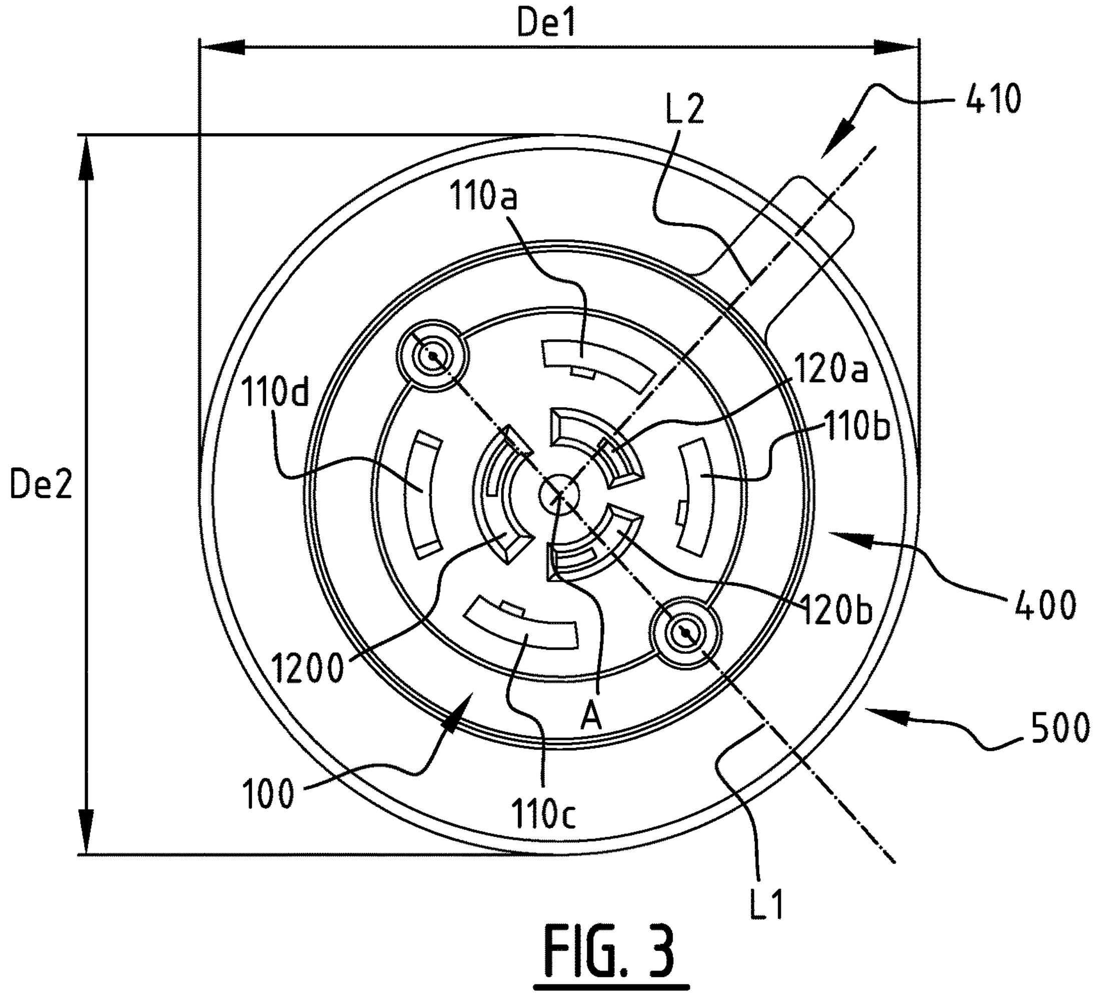
FIG. 3 is a schematic top view of an exemplary embodiment of a receptacle assembly in the mounted state, wherein also the periphery of an external module has been indicated.

The receptacle 100 has a front side 101 and a rear side 102. The front side 101 is configured for receiving contacts of the pluggable external module (not shown). An RFID tag may be provided at or near the front side 101, as indicated with arrow 199 in FIG. 1. The receptacle 100 is shown in FIGS. 1, 1A and 3. As shown in FIG. 3, the receptacle 100 houses a plurality of receptacle contacts 110*a-d*, 120*a-c*. Each receptacle contact 110*a-d*, 120*a-c* may be provided, at a front end, with a front contact portion configured for being electrically connected with a contact of an external module. Each receptacle contact 110*a-d*, 120*a-c* may be provided, at a rear end, with a wire receiving contact portion fixing a wire end of a wire 113 to be connected to components of the luminaire system. A receptacle contact 110*a*, 120*a* of said plurality of receptacle contacts may be provided, at said rear end, with one wire or with two or more wires. Preferably, the plurality of receptacle contacts 110*a-d*, 120*a-c* comprises at least two receptacle contacts for carrying power signals and/or one or more receptacle contacts for carrying data or control signals and/or one or more receptacle contacts for carrying both power signals and data or control signals. In the illustrates embodiment receptacle contacts 110*a-d* may be for carrying data or control signals and receptacle contacts 120*a-c* may be for carrying power signals.

The plurality of receptacle contacts 110*a-d*, 120*a-c* comprises a plurality of first receptacle contacts 110*a-d* and a plurality of second receptacle contacts 120*a-c*. As is best visible in FIG. 3, seen in a radial direction around a central axis A of the receptacle 100, the plurality of first receptacle contacts 110*a-d* are positioned further away from the central axis than the plurality of second receptacle contacts 120*a-c*. The plurality of first receptacle contacts 110*a-d* extends in an axial direction, substantially along a first (virtual) cylindrical surface around the central axis A, and the plurality of second receptacle contacts 120*a-c* extends in an axial direction, substantially along a second (virtual) cylindrical surface around the central axis A, said second cylindrical surface having a smaller diameter than said first cylindrical surface. The front contact portions 111*a-d* of the plurality of first receptacle contacts 110*a-d* extend flush with the front side 101 of the receptacle 100.

As shown in FIGS. 1 and 1A, the receptacle 100 may comprise a substantially cylindrical front portion 181 at the front side 101 of the receptacle 100, and a substantially cylindrical rear portion 182 at the rear side 102 of the receptacle 100. The front portion 181 has larger dimensions than the rear portion 182. The rear portion 182 is intended to be arranged through an opening in a housing of a luminaire, whilst the front portion 181 abuts against a wall of the luminaire housing. The substantially cylindrical rear portion 182 may be provided with a screw thread 170 for cooperating with a corresponding screw-thread 370 of the nut 300. As shown in FIG. 1, the nut 300 may be provided with a ribbed surface or a surface with a certain surface roughness, said surface being intended for being in contact with an inner surface of the luminaire housing. This will allow obtaining an improved fixation of the receptacle 100 in an opening of the luminaire housing H. In addition or alternatively, the receptacle 100 may also be fixed to the luminaire housing using screws which extend through fixation through-holes 195 provided in the front portion 181 of the receptacle 100, e.g. two diametrically opposite through-holes 195 as illustrated. Optionally, the receptacle 100 may be provided with a flat portion 190 on the peripheral wall of the rear portion 182 to ensure a proper alignment of the receptacle 100 with respect to the luminaire housing, and for some applications also a desired orientation with respect to the road. The receptacle 100 may be formed in one or in two or more parts. For example, the receptacle 100 may comprise a central body portion and a flange portion which are coupled to each other.

The gasket 400 is configured for being located between the receptacle 100 and the housing H on which the receptacle is to be mounted, and more in particular between the front portion 181 of the receptacle 100 and the housing. The gasket 400 is provided with an indicator means 410 at a location which is visible when the receptacle is mounted on the housing. This can be best understood when looking at the top view of FIG. 3 which shows that the indicator means 410 extends out of an area covered by the receptacle 100, and preferably even out of an area covered by the external module 500, seen in a top view of the mounted assembly. More in particular, FIG. 3 shows the contours of two external modules 500, one with a diameter De1 and one with a diameter De2. It can be seen that the indicator means 410 extends further than the contour of the external modules 500. In this way the indicator means 410 will be well visible to an operator mounting an external module 500. Preferably, the indicator means is configured to indicate a correct positioning of the external module 500 in the receptacle 100. More preferably, the receptacle 100 is configured to receive the external module 500 by inserting and twisting, as explained above in connection with FIG. 5, and the indicator means 410 is configured to indicate when the external module 500 is in the correct twisted position.

Preferably, the indicator means is an integral part of the gasket. Preferably, the indicator means is made of the same material as the gasket in a common mould. However, the indicator means could also be provided in a different manner, e.g. by overmoulding, and the indicator means could be made of a different material.

In the example of FIG. 1 and FIGS. 2A-2D, the indicator means 410 comprises a lip 411 protruding outwardly from an outer periphery 422 of the gasket 400, preferably over a length which is more than 10 mm, more preferably more than 15 mm. The gasket 400 is configured to be arranged around the rear portion 182 of the receptacle 100. The gasket 400 is provided with an opening 430 through which the rear side 102 of the receptacle 100 extends. In the illustrated embodiment, the gasket 400 has a peripheral inner wall 421*a*, 421*b* delimiting the opening 430, and the peripheral inner wall is provided with a cylindrical wall section 421*b* and a flat wall section 421*a* corresponding with the flat wall portion 190 of the rear portion 182. The gasket 400 is further provided with two through-holes 495 through which two fixation means such as screws can extend and which correspond with the fixation through-holes 495. Preferably, a radial line L1 through the first and second through-hole of the gasket and a radial line L2 through the indicator means are at an angle between 85° and 105°, preferably between 90° and 100°, see FIG. 3.

The gasket 400 is formed with a ring shaped portion 420 and the lip 411 connected to an outer periphery 433 of the ring shaped portion 420. The outer periphery 422 of the ring-shaped portion is substantially circular with an outer diameter D between 40 mm and 100 mm, preferably between 55 mm and 80 mm. Preferably, a radial length L of the lip 411 is larger than 10 mm, more preferably larger than 15 mm.

The gasket 400 has a top surface 440 intended to be in contact with the receptacle 100 and a bottom surface 450 intended to be in contact with the housing. The top surface 440 is provided with a least one alignment feature configured to align the gasket with respect to the receptacle, here three protrusions 442 arranged on a peripheral rib 441 configured to be in sealing engagement with the receptacle 100, see FIGS. 2B, 2C and 2D. The bottom surface 450 is provided with at least one peripheral rib 451, here three peripheral ribs 451, configured to be in sealing engagement with the housing, see FIG. 2A.

Figure 4A:
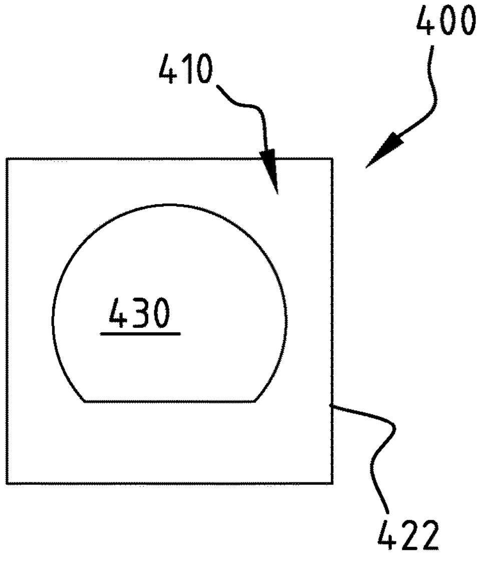
FIGS. 4A and 4B are top views of other exemplary embodiments of a gasket.
Figure 4B:
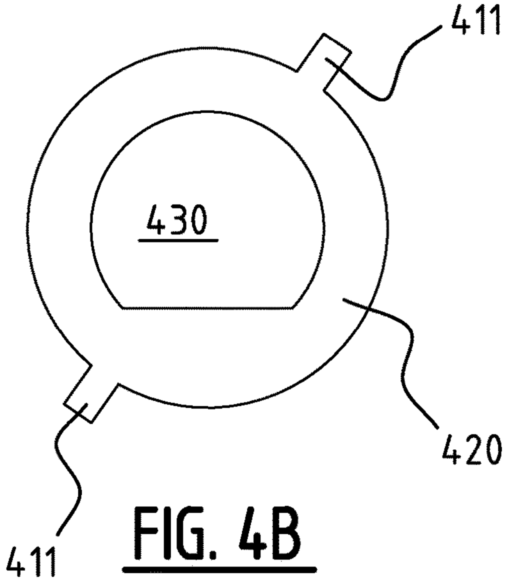

FIGS. 4A and 4B illustrate two further embodiments of suitable gaskets 400. In the embodiment of FIG. 4A, the indictor means 410 is formed by giving the gasket a polygonal outer periphery 422, such that one or more of the corners of the gasket 400 may form an indicator means 410. In the embodiment of FIG. 4B, the gasket 400 is provided with two lips 411 instead of one lip. This may further facilitate the visibility of the indicator means from different sides of the receptacle assembly. This skilled person understands that many variants are possible and that the gasket 400 may be given many suitable shapes that will result in an indicator means being present.

Figure 6:
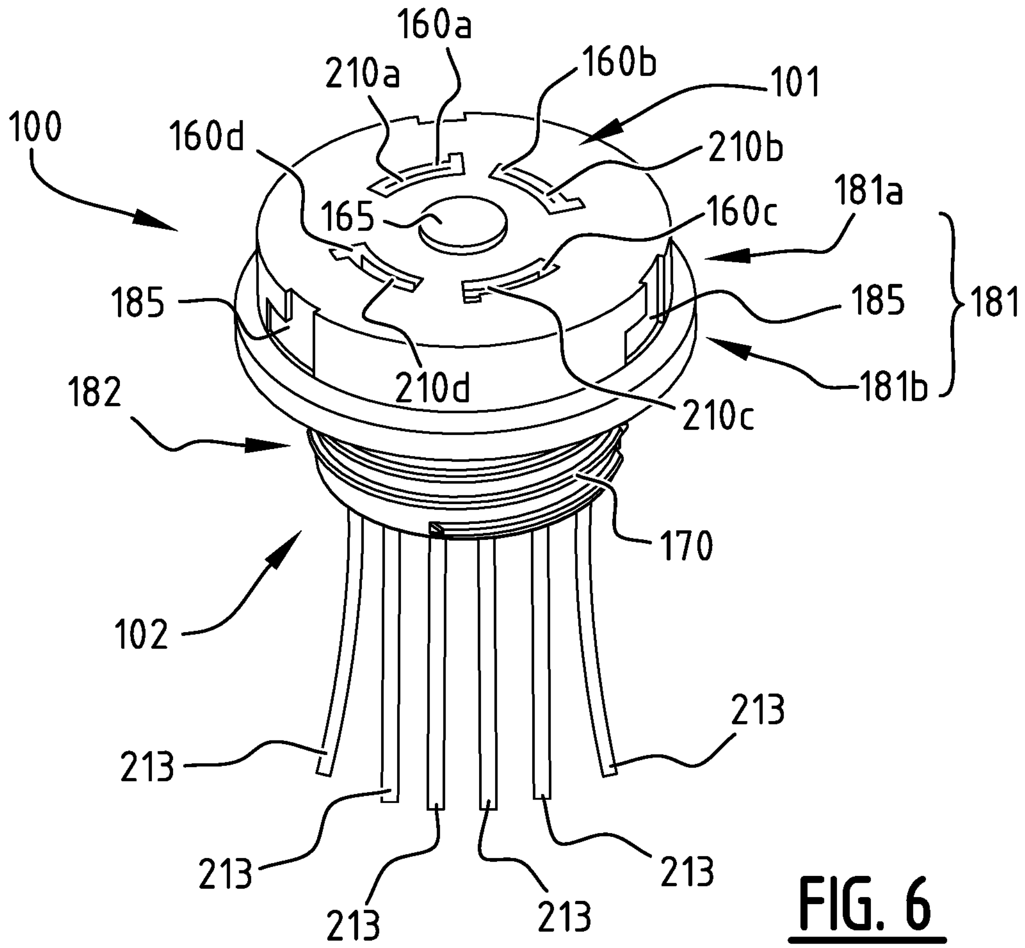
FIG. 6 is a schematic perspective view of another exemplary embodiment of a receptacle.

FIG. 6 illustrates another exemplary embodiment of a receptacle 100 having a front side 101 and a rear side 102, which may be used in embodiments of the invention. The receptacle 100 may be in accordance with the Zhaga standard (see LEX-R in book 18, Edition 1.0, July 2018). The front side 101 is configured for receiving electrical contacts of an external module (not shown) of a lighting equipment. The external module may also be in accordance with the Zhaga standard (see LEX-M in book 18, Edition 1.0, July 2018). The rear side 102 is intended for being electrically connected to components of the lighting equipment, such as a driver, a controller, a sensor, a metering device, an energy storage device, an actuator, protection circuitry, such as ESD, SPD, etc. (see also the list included above in the summary). The receptacle 100 houses a plurality of receptacle contacts 210*a-d* (shown in a schematic manner in FIG. 6) in apertures 160*a-d* arranged in the front side 101. Each receptacle contact 210*a-d* is provided, at a front end, with a front contact portion configured for being electrically connected with a contact of the external module, e.g. a prong similar to the prong 520 of FIG. 5, and, at a rear end, with at least one wire receiving contact portion in which at least one wire 123 is fixed. The front contact portions of the plurality of receptacle contacts 210*a-d* extend near the front side 101 of the receptacle 100. The plurality of receptacle contacts 210*a-d* extends substantially along a first cylindrical surface around a central axis of the receptacle. The front side 101 of the receptacle 100 may be provided with a central recess 165 configured for receiving a central pin of the external module, preferably in accordance with the above mentioned Zhaga standard. Optionally, the receptacle 100 comprises an RFID tag (not shown in FIG. 6), preferably at the front side 101 of the receptacle 100. Also other components may be included in the receptacle 100, such as wireless communication means, sensor means, an antenna, protection circuitry, etc.

The receptacle 100 has a housing comprising a substantially cylindrical front portion 181 at the front side 101 of the receptacle 100, and a rear portion 182 protruding rearward at a rear side of the cylindrical front portion 181. The rear portion 182 is provided at the rear side thereof with a screw-thread 170. The receptacle assembly may further comprise a nut (not shown in FIG. 6) configured to be screwed on the screw-thread 170. The substantially cylindrical front portion 181 may comprise a first substantially cylindrical front portion 181*a* having a first diameter and a second substantially cylindrical front portion 181*b* having a second diameter which is larger than the first diameter. A peripheral surface of the first substantially cylindrical front portion 181*a* may be provided with recesses 185 adapted to cooperate with notches of the external module in order to lock an external module in the receptacle.

Preferably, the plurality of receptacle contacts 210*a-d* comprises: at least one receptacle contact for carrying power signals, and/or at least one receptacle contact for carrying data or control signals, and/or at least one receptacle contacts for carrying a power signal and a data or control signal. For example, contact 210*b* may be a DC power supply (e.g. 24 V), contact 210*c* may be a positive pole for a dimming protocol (e.g. DALI), contact 210*a* may be a general digital I/O (e.g. greater than 7 V), and contact 210*d* may be at the same time a negative pole for the dimming protocol, a ground for the power supply, a ground for the general digital I/O.

Figure 7:
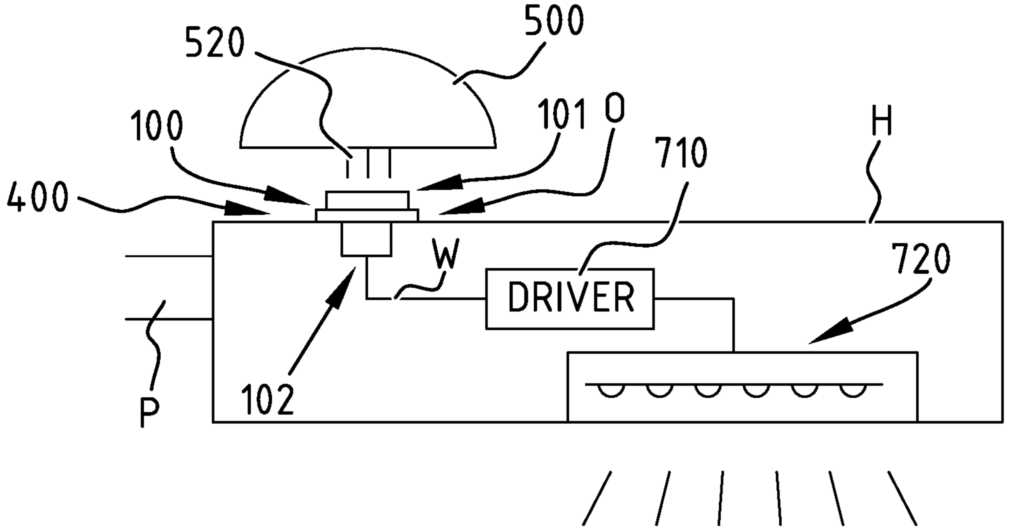
FIG. 7 is a schematic view of a luminaire head comprising a receptacle.

FIG. 7 illustrates a luminaire head with a housing H in which electrical components, such as a driver 710 and a PCB 720 with LEDs, are arranged. The luminaire housing H has an opening O, in which a receptacle assembly with a receptacle 100 and a gasket 400 is arranged. The front side 101 of the receptacle 100 faces the external module and the rear side 102 faces an inner space of the luminaire housing H. The gasket 400 is arranged partially between an outer surface of the housing H and a portion of the receptacle located outside of the housing H. The wires W (for reasons of simplicity only one line is drawn, but this line represents more than one wire) of the receptacle 100 are connected to the electrical components. As shown, the luminaire housing H may be configured to be attached to a pole P. FIG. 7 shows a so-called "side-entry" luminaire of a luminaire, but the skilled person understand that embodiments of the invention are equally applicable to other types of luminaire such as so called "post-top" luminaires where the pole extends below the luminaire housing or modular luminaires comprising a plurality of pole modules mounted one above the other.

FIG. 8 shows an example of a receptacle assembly 1000 comprising a receptacle 100 and a gasket 400. The gasket 400 is mounted between a housing (not shown in FIG. 8) and the receptacle 100 and in a predetermined relative angular position with respect to the receptacle 100, for example in a manner as explained above. In the embodiment of FIG. 8, the gasket 400 comprises a lip 411 which functions as the indicator means 410.

Figure 8A:
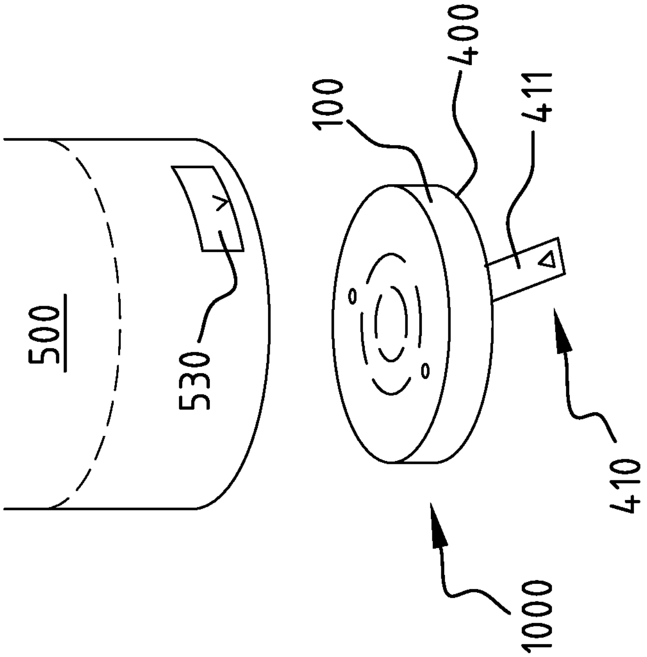
FIG. 8A shows a receptacle assembly and a compatible external module to be mounted.
Figure 8B:
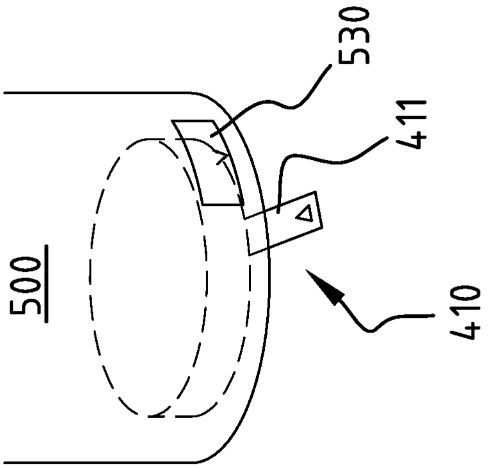
FIG. 8B shows the receptacle assembly of FIG. 8A with the external module partly mounted.
Figure 8C:
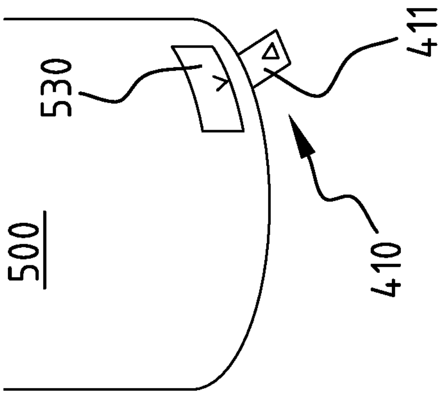
FIG. 8C shows the receptacle assembly of FIG. 8A with the external module completely mounted.

FIG. 8 shows an external module 500. The external module 500 comprises a shell protecting inner elements from external influences such as water and dirt. The shell has a lower end which at least partially covers the receptacle 100 when the external module 500 is mounted on the receptacle 100. Particularly in such embodiment, it is advantageous to form the indicator means 410 as a lip 411 extending outward from the gasket 400 such that it protrudes beyond the shell when the external module 500 is mounted on the receptacle 100. This is illustrated in FIGS. 8B and 8C. Mounting of the external module 500 onto the receptacle 100 typically requires a two-stage movement. Firstly, the external module 500 is moved towards the receptacle 100 by a translational movement of the external module 500 along the central axis A of the receptacle 100. This corresponds to moving from FIG. 8A to FIG. 8B. Secondly, the external module 500 is rotated with respect to the receptacle around the central axis A. This corresponds to moving from FIG. 8B to FIG. 8C.

The indicator means 410 is particularly relevant in the second stage of the movement. To this end, the external module 500 preferably comprises a further indicator 530 which is arranged to be aligned with the indicator means 410 when the external module 500 is correctly mounted onto the receptacle 100.

When the external module 500 comprises an RFID tag or reader which is to be aligned with a corresponding RFID reader or tag at the receptacle 100, the angular position of the indicator means 410 with respect to the receptacle 100 corresponds to the angular position of the further indicator 530 with respect to the external module 500 such that the RFID elements are aligned wen the indicators 410 and 530 are aligned.

Figure 9A:
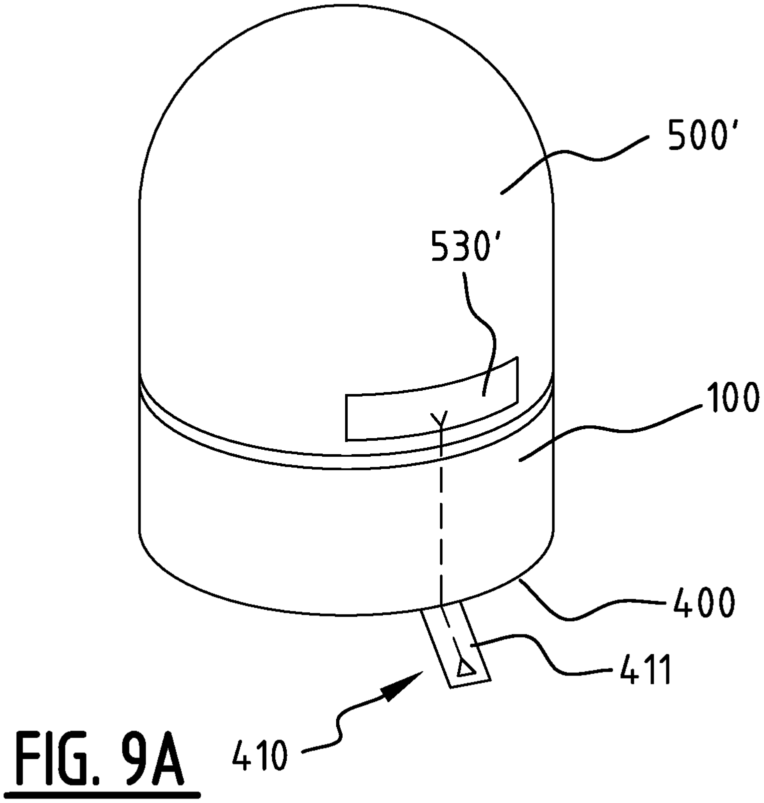
FIGS. 9A and 9B show different embodiments of an alternative receptacle assembly and external module mounted thereon.
Figure 9B:
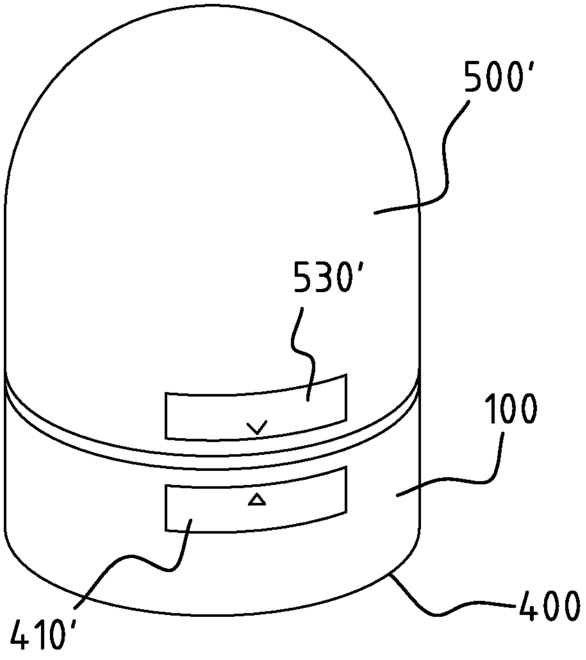

FIGS. 9A and 9B show another embodiment wherein the external module 500 is mounted substantially on top of the receptacle 100 without extending over the receptacle 100. In FIG. 9A, the indicator means 410 is formed on a lip 411 of a gasket 400. The further indicator 530' is aligned with the indicator means 410 for correct mounting of the external module 500. FIG. 9B shows another embodiment wherein the indicator means 410' is arranged on the receptacle 100. In particular, the indicator means 410' is formed as a sticker or a label positioned on a side surface of the receptacle 100. Because in this embodiment the external module 500' does not extend over the receptacle 100, the side surface of the receptacle 100 is still visible when the external module 500' is mounted. For correct mounting of the external module 500', the indicator means 410' and the further indicator 530' are aligned. In yet another embodiment, the indicator means may be provided on the housing, preferably at a position which is close to the opening in the housing. In an exemplary embodiment, the receptacle, and in particular the rear portion thereof, may be provided with a flat portion on the peripheral wall between the front side and the rear side to ensure a proper alignment of the receptacle with respect to the opening in the housing. The opening in the housing may preferably be provided with a corresponding flat portion. In such an exemplary embodiment, the indicator means may be provided on the housing at a position which is close to the flat portion of the opening in the housing, thereby also ensuring a proper alignment of the external module with respect to the receptacle. A further indicator may be provided to the external module. For correct mounting of the external module, the indicator means and the further indicator are aligned.

In the figures, the indicator means and the further indicator are shown as a simple visual mark. It will be clear that in some embodiments, one or both of the indicator means and the further indicator may be more "complex" and could for example further comprise an RFID tag or any other communication means (e.g. Bluetooth) or further comprise a "smart label" such as a QR code.

Whilst the principles of the invention have been set out above in connection with specific embodiments, it is to be understood that this description is merely made by way of example and not as a limitation of the scope of protection which is determined by the appended claims.

The invention claimed is:

1. A receptacle assembly for a luminaire system, said receptacle assembly comprising a receptacle and a gasket;

said receptacle having a front side and a rear side, said front side being configured for receiving electrical contacts of an external module, said rear side being configured for extending in an opening of a housing, preferably a luminaire housing, and for being electrically connected to components in the housing;

said gasket being configured for being located between the receptacle and the housing on which the receptacle is to be mounted;

wherein said receptacle assembly is provided with an indicator means at a location which is visible when the receptacle is mounted on the housing;

wherein the receptacle is configured to receive the external module by inserting and twisting, and wherein the indicator means is configured to indicate when the external module is in the correct twisted position.

2. The receptacle assembly of claim 1, wherein the receptacle is configured to receive and cooperate with the external module, and the indicator means is provided to the receptacle assembly at a location which is visible when the external module is mounted on the receptacle.

3. The receptacle assembly of claim 1, wherein the indicator means is provided to the gasket at a location which is visible when the receptacle is mounted on the housing.

4. The receptacle assembly of claim 3, wherein the indicator means is an integral part of the gasket.

5. The receptacle assembly of claim 1, wherein the indicator means is configured to indicate a correct positioning of the external module in the receptacle.

6. The receptacle assembly of claim 1, wherein the indicator means comprises a lip protruding outwardly from a periphery of the gasket, preferably over a length which is more than 10 mm, more preferably more than 15 mm.

7. The receptacle assembly of claim 1, wherein the receptacle has a housing comprising a substantially cylindrical front portion at the front side of the receptacle, and a rear portion protruding rearwardly at a rear side of the substantially cylindrical front portion and intended to extend through an opening in the housing, and wherein the gasket is configured to be arranged around said rear portion; and/or wherein the receptacle is provided with a flat portion on the peripheral wall between the front side and the rear side to ensure a proper alignment of the receptacle with respect to the opening in the housing, wherein the gasket is provided with an opening through which the rear side of the receptacle extends, and wherein a peripheral inner wall of the gasket delimiting said opening is provided with a corresponding flat wall section.

8. The receptacle assembly of claim 1, wherein the receptacle is provided with at least two fixation through-holes for receiving at least two fixation means for fixing the receptacle on the housing, and wherein the gasket is provided with at least two corresponding through-holes through which said at least two fixation means can extend;

wherein preferably the at least two fixation though-holes comprise a first and a second fixation through-hole located at opposite sides of the receptacle, and wherein the at least two corresponding though-holes in the gasket comprise a first and a second through-hole located at opposite sides of the gasket;

wherein preferably a radial line through the first and second through-hole of the gasket and a radial line through the indicator means are at an angle between 85° and 105°, preferably between 90° and 100°.

9. The receptacle assembly of claim 1, wherein the gasket has a ring shaped portion and a lip portion connected to an outer periphery of the ring shaped portion; and/or wherein the outer periphery of the ring-shaped portion is substantially circular with an outer diameter between 40 mm and 100 mm, preferably between 55 mm and 80 mm, and wherein a radial length of the lip portion is larger than 10 mm.

10. The receptacle assembly of claim 1, wherein the gasket has a top surface intended to be in contact with the receptacle and a bottom surface intended to be in contact with the housing;

wherein preferably the top surface is provided with a least one alignment feature configured to align the gasket with respect to the receptacle; and/or wherein preferably the top surface is provided with a peripheral rib configured to be in sealing engagement with the receptacle; and/or wherein preferably the bottom surface is provided with at least one peripheral rib configured to be in sealing engagement with the housing.

11. The receptacle assembly of claim 10, wherein the at least one alignment feature comprises at least two protrusions;

wherein preferably the at least two protrusions are arranged on the peripheral rib.

12. The receptacle assembly of claim 1, wherein the receptacle houses a plurality of receptacle contacts;

wherein preferably each receptacle contact is provided, at a front end, with a front contact portion configured for being electrically connected with a contact of the external module, and, at a rear end, with at least one wire receiving contact portion in which at least one wire is fixed; and/or wherein preferably the plurality of receptacle contacts comprises a plurality of first receptacle contacts and optionally one or more second receptacle contacts.

13. The receptacle assembly according to claim 12, wherein seen in a radial direction around a central axis of the receptacle, the plurality of first receptacle contacts is positioned further away from the central axis than the one or more second receptacle contacts; and/or wherein the plurality of first receptacle contacts extends substantially along a first cylindrical surface around a central axis of the receptacle.

14. The receptacle assembly according to claim 12, wherein the at least one second receptacle contact comprises a plurality of second receptacle contacts extending substantially along a second cylindrical surface around a central axis of the receptacle; and/or wherein front contact portions of the plurality of first receptacle contacts extend flush with the front side of the receptacle; and/or wherein the plurality of receptacle contacts comprises at least three receptacle contacts comprising:

at least one receptacle contact for carrying a power signal, and/or at least one receptacle contact for carrying data or control signals, and/or at least one receptacle contact for carrying power signals and data or control signals.

15. The receptacle assembly according to claim 1, wherein the receptacle comprises an RFID tag, preferably at the front side of the receptacle; and/or wherein the receptacle is configured for being substantially surrounded by the external module when the external module is mounted on the receptacle; and/or wherein a diameter of the receptacle is smaller than a diameter of the external module, and a diameter of the gasket is larger than the diameter of the external module at least at the location of the indicator means; and/or wherein the gasket is provided with an outwardly protruding portion configured for, at the location of the indicator means, extending beyond the external module when the external module is mounted on the receptacle.

16. Use of a receptacle assembly according to claim 1, for mounting an external module, said external module having an indication, wherein said indication is aligned with the indicator means of the receptacle assembly, preferably of the gasket of the receptacle assembly.

17. Use of a receptacle assembly according to claim 1, for transferring at least two power signals and at least one data and/or control signal via a plurality of receptacle contacts between one or more components of an external module and one or more components arranged in a housing of a luminaire system.

18. The receptacle assembly of claim 1, wherein the receptacle is provided at the rear side thereof with a screw-thread, and wherein the receptacle assembly further comprises a nut configured to be screwed on the screw-thread of the receptacle.

19. A luminaire comprising electrical components, a luminaire housing in which the electrical components are arranged, and a receptacle assembly, said receptacle assembly comprising a receptacle and a gasket;

said receptacle having a front side and a rear side, said front side being configured for receiving electrical contacts of an external module, said rear side being configured for extending in an opening of a housing, preferably a luminaire housing, and for being electrically connected to components in the housing;

said gasket being configured for being located between the receptacle and the housing on which the receptacle is to be mounted;

wherein said receptacle assembly is provided with an indicator means at a location which is visible when the receptacle is mounted on the housing;

said luminaire housing having an opening, wherein the receptacle is arranged partially in the opening of the luminaire housing with its rear side facing an inner space of the luminaire housing and its front side accessible outside the luminaire housing, wherein the gasket is arranged between the receptacle and an outer surface of the housing, around the opening with the indicator means visible, and wherein wires connect the receptacle to the electrical components;

preferably further comprising a light source arranged in the luminaire housing; and wherein the receptacle is configured to receive the external module by inserting and twisting, and wherein the indicator means is configured to indicate when the external module is in the correct twisted position.

20. A receptacle assembly for a luminaire system, said receptacle assembly comprising a receptacle and a gasket;

said receptacle having a front side and a rear side, said front side being configured for receiving electrical contacts of an external module, said rear side being configured for extending in an opening of a housing, preferably a luminaire housing, and for being electrically connected to components in the housing;

said gasket being configured for being located between the receptacle and the housing on which the receptacle is to be mounted;

wherein said receptacle assembly is provided with an indicator means at a location which is visible when the receptacle is mounted on the housing;

wherein the receptacle is configured to receive the external module by inserting and twisting; and wherein the receptacle is provided at the rear side thereof with a screw-thread, and wherein the receptacle assembly further comprises a nut configured to be screwed on the screw-thread of the receptacle.

* * * * *